(12) United States Patent
Kubota et al.

(10) Patent No.: US 8,871,332 B2
(45) Date of Patent: Oct. 28, 2014

(54) TRANSPARENT FLUORINE-CONTAINING POLYMER

(75) Inventors: Toshio Kubota, Hitachi (JP); Takehiro Nagasawa, Funabashi (JP); Akira Hirooka, Funabashi (JP); Makoto Hirooka, legal representative, Takasaki (JP); Eiko Hirooka, legal representative, Takasaki (JP)

(73) Assignees: Ibaraki University, Mito-Shi (JP); Nissan Chemical Industries, Ltd., Tokyo (JP)

( * ) Notice: Subject to any disclaimer, the term of this patent is extended or adjusted under 35 U.S.C. 154(b) by 438 days.

(21) Appl. No.: 13/391,056

(22) PCT Filed: Aug. 16, 2010

(86) PCT No.: PCT/JP2010/063807
§ 371 (c)(1),
(2), (4) Date: Feb. 27, 2012

(87) PCT Pub. No.: WO2011/021598
PCT Pub. Date: Feb. 24, 2011

(65) Prior Publication Data
US 2012/0148808 A1 Jun. 14, 2012

(30) Foreign Application Priority Data
Aug. 19, 2009 (JP) ................. 2009-189882

(51) Int. Cl.
| | |
|---|---|
| *B32B 3/00* | (2006.01) |
| *C08F 220/06* | (2006.01) |
| *C08L 33/02* | (2006.01) |
| *C08L 33/10* | (2006.01) |
| *C08F 8/00* | (2006.01) |
| *C08F 220/18* | (2006.01) |
| *C08F 216/12* | (2006.01) |

(52) U.S. Cl.
CPC ........... *C08F 220/18* (2013.01); *C08F 216/125* (2013.01)
USPC ................. 428/195.1; 526/247; 525/326.2; 524/544

(58) Field of Classification Search
USPC ......................................... 526/247
See application file for complete search history.

(56) References Cited

U.S. PATENT DOCUMENTS 4,705,740 A   11/1987   Geissler et al.

FOREIGN PATENT DOCUMENTS

JP   2007-314586 A   12/2007

OTHER PUBLICATIONS

International Search Report, dated Nov. 16, 2010, issued in PCT/JP2010/063807.
Kubota et al., "New fluorine-containing transparent polymer", Ibaraki University VBL Nenpo, vol. 2007, pp. 27-28, 2008.
Takaki et al., "Preparation of Monomers from Perfluorocyclopentene and its Polymerization", Department of Materials Science, vol. 30th, pp. 67-69, Nov. 9, 2006.
Takaki et al., "Polymerization of 1-Perfluorocyclopententenyl 3-Butenyl Ether", Department of Material Science, vol. 29th, pp. 125-127, Nov. 1, 2005.

*Primary Examiner* — Mark Ruthkosky
*Assistant Examiner* — Ian Rummel
(74) *Attorney, Agent, or Firm* — Birch, Stewart, Kolasch & Birch, LLP

(57) ABSTRACT

Disclosed is a fluorine-containing polymer obtained by polymerizing a 1,6-diene-type ether compound represented by formula [1] and, for example, a (meth)acrylic acid compound represented by formula [2]. The fluorine-containing polymer shows high transparency, has a high glass transition point, and is soluble in a solvent and therefore has moldability. In the case where a (meth)acrylic unit has a reactive substituent, by utilizing the crosslinking reaction thereof, a thin film having high solvent resistance can be produced.

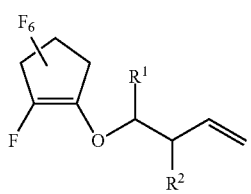

[1]

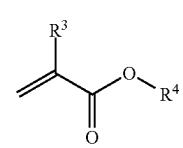

[2]

In formulae [1] and [2], $R^1$ and $R^2$ each independently represent a hydrogen atom or an alkyl group having 1 to 12 carbon atoms, which may be substituted, $R^3$ represents a hydrogen atom, a fluorine atom, or a methyl group, and $R^4$ represents a hydrogen atom, an alkyl group having 1 to 12 carbon atoms, which may be substituted, or an aromatic group having 5 to 10 ring members, which may be substituted.

11 Claims, No Drawings

TRANSPARENT FLUORINE-CONTAINING POLYMER

TECHNICAL FIELD

This invention relates to a transparent fluorine-containing polymer and more particularly, to a polymer of a fluorine-containing 1,6-diene-type ether compound and a (meth)acrylic acid derivative and also to a method for preparing same.

BACKGROUND ART

Polytetrafluoroethylene (PTFE), which is typical of fluorine-based polymers, exhibits high heat and chemical resistances and is opaque because of the crystallinity thereof. Cytop (registered trade name) and Teflon (registered trade name) AF are amorphous and solvent-soluble transparent polymers and are utilized as a low-reflection film. Nevertheless, they are low in glass transition point, for which limitation is placed on their use.

On the other hand, although octafluorocyclopentene (OFCP) is an industrially produced cycloolefin, its use as a monomer has been very rare due to the poor polymerizability thereof.

The present applicant has already reported that there is obtained a fluorine-containing polymer having a high glass transition point by polymerizing a 1,6-diene-type ether compound obtained by reaction between OFCP and a homoallyl alcohol (see Patent Document 1).

However, materials that satisfy all the characteristics of refractive index, heat resistance and glass transition point have never been obtained yet.

PRIOR-ART DOCUMENT

Patent Document

Patent Document 1: JP-A 2007-314586

SUMMARY OF THE INVENTION

Problems to be Solved by the Invention

The invention has been made under such circumstances as set out above and has for its object the provision of a fluorine-containing polymer of low refractive index and a method for preparing same.

Means for Solving the Problems

The present inventors have made intensive studies in order to solve the above problem and, as a result, found that when a specific type of fluorine-containing 1,6-diene-type ether compound and a (meth)acrylic acid derivative are copolymerized, a fluorine-containing polymer of low refractive index can be obtained, thereby arriving at completion of the invention.

More particularly, the invention provides:
1. A fluorine-containing polymer, characterized by being obtained by polymerizing a 1,6-diene-type ether compound represented by the formula [1] and a (meth)acrylic acid compound

[Chemical Formula 1]

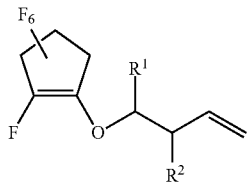

[1]

(wherein $R^1$ and $R^2$ each independently represent a hydrogen atom or an alkyl group which may be substituted and has 1 to 12 carbon atoms);
2. The fluorine-containing polymer of 1, wherein the (meth)acrylic acid compound is represented by the formula [2]

[Chemical Formula 2]

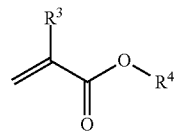

[2]

(wherein $R^3$ represents a hydrogen atom, a fluorine atom or a methyl group, $R^4$ represents a hydrogen atom, an alkyl group which may be substituted and has 1 to 12 carbon atoms, or an aromatic residue which may be substituted and has 5 to 10 ring members);
3. A fluorine-containing polymer, characterized by including structural units represented by the formula [3] and/or formulas [4] and [5]

[Chemical Formula 3]

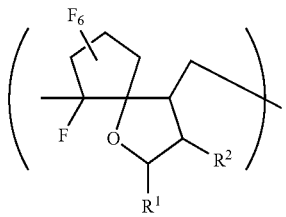

[3]

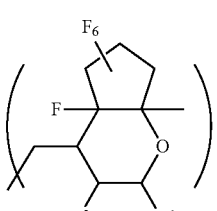

[4]

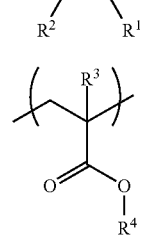

[5]

(wherein $R^1$ and $R^2$ each independently represent a hydrogen atom or an alkyl group which may be substituted and has 1 to 12 carbon atoms, $R^3$ represents a hydrogen atom, a fluorine atom or a methyl group, and $R^4$ represents a hydrogen atom, an alkyl group which may be substituted and has 1 to 12 carbon atoms, or an aromatic group which may be substituted and has 5 to 10 ring members);

4. The fluorine-containing polymer of 2 or 3, wherein the $R^4$ is an alkyl group substituted with a reactive substituent group and having 1 to 12 carbon atoms;
5. A fluorine-containing polymer obtained by crosslinking reaction of the fluorine-containing polymer of 4;
6. The fluorine-containing polymer of any of 1 to 5 wherein the $R^1$ represents an alkyl group having 1 to 12 carbon atoms or a fluoroalkyl group having 1 to 12 carbon atoms, and the $R^2$ represents a hydrogen atom;
7. The fluorine-containing polymer of any of 1 to 6 having a refractive index of 1.30 to 1.50 at a wavelength of 633 nm;
8. A varnish containing the fluorine-containing polymer of any of 1 to 7;
9. A thin film containing the fluorine-containing polymer of any of 1 to 7;
10. A micropattern obtained by subjecting a thin film containing the fluorine-containing polymer of 4 to pattern exposure to cause an exposed portion of the thin film to be insolubilized in a solvent, and removing a non-exposed portion of the thin film by use of the solvent; and
11. A method for preparing a fluorine-containing polymer containing structural units represented by the formula [3] and/or the formulas [4] and [5], characterized by polymerizing a 1,6-diene-type ether compound represented by the formula [1] and a (meth)acrylic acid compound represented by the formula [2] in the presence of a radical generating agent

[Chemical Formula 4]

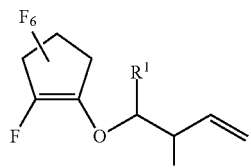

[1]

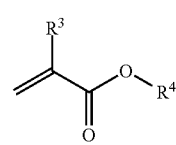

[2]

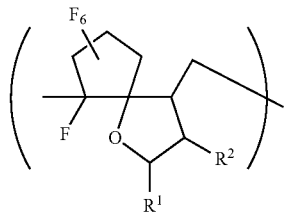

[3]

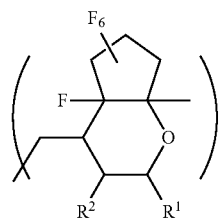

[4]

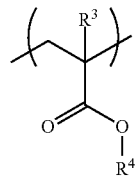

[5]

(wherein $R^1$ and $R^2$ each independently represent a hydrogen atom or an alkyl group which may be substituted and has 1 to 12 carbon atoms, $R^3$ represents a hydrogen atom, a fluorine atom or a methyl group, and $R^4$ represents a hydrogen atom, an alkyl group which may be substituted and has 1 to 12 carbon atoms, or an aromatic group which may be substituted and has 5 to 10 ring members).

Advantageous Effect of the Invention

According to the invention, there can be obtained a fluorine-containing polymer, which is high in transparency, has a high glass transition point, and is soluble in solvent and is moldable and which is able to provide a thin film having a high solvent resistance by utilizing crosslinking reaction in the case where (meth)acryl units have a reactive substituent group.

The fluorine-containing polymer of the invention is a high-functional polymer, which exhibits low refractive index, high glass transition point, high transparency and solvent solubility and is able to impart a high solvent resistance by crosslinking reaction. When using these characteristics, many applications as a coating material or bulk material will be expected. For instance, the polymer is effective for use in the fields of advanced technologies such as of optical materials such as low-reflection films, clads of optical waveguide and the like, and semiconductor materials such as pellicles, resists and the like in semiconductor lithography along with protective film materials, insulating film materials, water-repellant materials and the like.

EMBODIMENT FOR CARRYING OUT THE INVENTION

The invention is now described in more detail.

The fluorine-containing polymer of the invention is one obtained by polymerizing a 1,6-diene-type ether compound represented by the formula [1] and a (meth)acrylic acid compound.

In the formula [1], $R^1$ and $R^2$ each independently represent a hydrogen atom or an alkyl group which may be substituted and has 1 to 12 carbon atoms.

Specific examples of $R^1$ and $R^2$ include a hydrogen atom, a linear alkyl group, a linear fluoroalkyl group, a branched alkyl group, a branched fluoroalkyl group, a cyclic alkyl group, a cyclic fluoroalkyl group and the like.

Of these, it is preferred in view of polymerization reactivity of the compound to use, as $R^1$, a hydrogen atom, a linear alkyl group, a linear fluoroalkyl group, a branched alkyl group, branched fluoroalkyl group, a cyclic alkyl group and a cyclic fluoroalkyl group. From the standpoint of obtaining a polymer of low refractive index, it is more preferred to use a linear fluoroalkyl group, a branched fluoroalkyl group and a cyclic fluoroalkyl group. In view of the biosafety of the compound, a fluoroalkyl group having 1 to 6 carbon atoms is most preferred.

On the other hand, it is preferred from the standpoint of polymerization reactivity of the compound to use, as $R^2$, a hydrogen atom, a linear alkyl group, a linear fluoroalkyl group, a branched alkyl group, a branched fluoroalkyl group, a cyclic alkyl group and a cyclic fluoroalkyl group, of which a hydrogen atom is more preferred.

Typical examples of the linear, branched or cyclic alkyl group include a methyl group, an ethyl group, an n-propyl group, an isopropyl group, a cyclopropyl group, an n-butyl group, an isobutyl group, a sec-butyl group, a tert-butyl group, a cyclobutyl group, a 1-methylcyclopropyl group, a 2-methylcyclopropyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a cyclopentyl group, a 1-methylcyclobutyl group, a 2-methylcyclobutyl group, a 3-methylcyclobutyl group, a 1,2-dimethylcyclopropyl group, a 2,3-dimethylcyclopropyl group, a 1-ethylcyclopropyl group, a 2-ethylcyclopropyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a cyclohexyl group, a 1-methylcyclopentyl group, a 2-methylcyclopentyl group, a 3-methylcyclopentyl group, a 1-ethylcyclobutyl group, a 2-ethylcyclobutyl group, a 3-ethylcyclobutyl group, a 1,2-dimethylcyclobutyl group, a 1,3-dimethylcyclobutyl group, a 2,2-dimethylcyclobutyl group, a 2,3-dimethylcyclobutyl group, a 2,4-dimethylcyclobutyl group, a 3,3-dimethylcyclobutyl group, a 1-n-propylcyclopropyl group, a 2-n-propylcyclopropyl group, a 1-isopropylcyclopropyl group, a 2-isopropylcyclopropyl group, a 1,2,2-trimethylcyclopropyl group, a 1,2,3-trimethylcyclopropyl group, a 2,2,3-trimethylcyclopropyl group, a 1-ethyl-2-methylcyclopropyl group, a 2-ethyl-1-methylcyclopropyl group, a 2-ethyl-2-methylcyclopropyl group, a 2-ethyl-3-methylcyclopropyl group, an n-heptyl group, an n-octyl group, an n-nonyl group, an n-decyl group and the like.

These alkyl groups may be further substituted.

Typical examples of the linear, branched or cyclic fluoroalkyl group include a trifluoromethyl group, a pentafluoroethyl group, a 2,2,2-trifluoroethyl group, a heptafluoropropyl group, a 2,2,3,3,3-pentafluoropropyl group, a 2,2,3,3-tetrafluoropropyl group, a 2,2,2-trifluoro-1-(trifluoromethyl)ethyl group, a nonafluorobutyl group, a 4,4,4-trifluorobutyl group, an undecafluoropentyl group, a 2,2,3,3,4,4,5,5,5-nonafluoropentyl group, a 2,2,3,3,4,4,5,5-octafluoropentyl group, a tridecafluorohexyl group, a 2,2,3,3,4,4,5,5,6,6,6-undecafluorohexyl group, a 2,2,3,3,4,4,5,5,6,6-decafluorohexyl group, a 3,3,4,4,5,5,6,6,6-nonafluorohexyl group and the like.

It will be noted that the above 1,6-diene-type ether compound is preferably liquid at 25° C.

The method of preparing the 1,6-diene-type ether compound represented by the formula [1] is not critical. For one instance, mention is made of a method wherein a homoallyl alcohol derivative and OFCP are reacted in the presence of a base as is particularly described in the afore-indicated Patent Document 1.

This reaction is such that using a base, the homoallyl alcohol is converted to a corresponding alkoxide, and the resulting alkoxide and OFCP are reacted to obtain a 1,6-diene-type ether compound.

In this case, the amount of OFCP is preferably at 0.1 to 10 times by mole, more preferably at 0.2 to 5 times by mole, relative to the homoallyl alcohol derivative.

Usable bases include: alkali metal hydroxides such as lithium hydroxide, sodium hydroxide, potassium hydroxide and the like; alkali metal alkoxides such as sodium methoxide, sodium ethoxide, sodium tert-butoxide, potassium tert-butoxide and the like; and alkali metal hydrides such as sodium hydride and the like. Among them, alkali metal hydroxides are preferred, of which potassium hydroxide is more preferred.

The amount of the base is preferably at 0.5 to 10 times by mole, more preferably at 1 to 5 times by mole, relative to the homoallyl alcohol derivative of the substrate.

For the reaction, no solvent may be used. If a solvent is used, any types of solvents may be used so far as they do not adversely influence the reaction and include, for example, aliphatic hydrocarbons such as pentane, hexane, heptane, octane, cyclohexane and the like; ethers such as diethyl ether, diisopropyl ether, dibutyl ether, cyclopentyl methyl ether, tetrahydrofuran, 1,4-dioxane and the like; and aromatic hydrocarbons such as benzene, toluene, xylene, mesitylene and the like.

The amount of the solvent is not critical, but the use of a solvent in large amounts is unfavorable from the standpoint of economy.

The reaction temperature is generally at −100 to 200° C., preferably at −20 to 20° C.

The reaction time is generally at 0.1 to 24 hours, preferably at 1 to 5 hours.

After completion of the reaction, ordinary after-treatments are carried out, followed by purification, if necessary, to obtain an intended product.

The purification method includes a method using silica gel column chromatography, a distillation method and the like, of which the distillation method is preferred in view of its simplicity in operation.

The (meth)acrylic acid compound to be copolymerized with the 1,6-diene-type ether compound represented by the foregoing formula [1] is not critical in type. In the practice of the invention, such a (meth)acrylic acid compound represented by the formula [2] is preferred.

It is to be noted that in the present specification, the term "(meth)acryl" means "methacryl or acryl," e.g. (meth)acrylic acid indicates methacrylic acid or acrylic acid.

In the foregoing formula [2], $R^3$ represents a hydrogen atom, a fluorine atom or a methyl group, and $R^4$ represents a hydrogen atom, an alkyl group which may be substituted and has 1 to 12 carbon atoms, or an aromatic group which may be substituted and has 5 to 10 ring members.

Specific examples of $R^4$ include a hydrogen atom, a linear alkyl group, a linear fluoroalkyl group, a branched alkyl group, a branched fluoroalkyl group, a cyclic alkyl group, a cyclic fluoroalkyl group, an arylalkyl group, a phenyl group, a heteroaryl group and the like.

Among them, it is preferred from the standpoint of polymerization reactivity of the compound to use a hydrogen atom, a linear alkyl group, a linear fluoroalkyl group, a branched alkyl group, a branched fluoroalkyl group, a cyclic alkyl group, a cyclic fluoroalkyl group and an arylalkyl group. From the standpoint of obtaining polymers of low refractive index, it is more preferred to use a linear fluoroalkyl group, a branched fluoroalkyl group and a cyclic fluoroalkyl group.

From the standpoint of biosafety of the compound, it is most preferred to use a fluoroalkyl group having 1 to 6 carbon atoms.

Typical examples of these linear, branched or cyclic alkyl group and fluoroalkyl group are those substituent groups exemplified with respect to the above-mentioned $R^1$.

Typical examples of the arylalkyl group include a benzyl group, a phenethyl group, a naphthylmethyl group and the like. Typical examples of the heteroaryl group include a pyridyl group, a furanyl group, a thienyl group and the like.

From the standpoint of making a solvent-insoluble thin film by further subjecting the resulting fluorine-containing polymer to crosslinking reaction, an alkyl group having 1 to 12 carbon atoms, which is substituted with a reactive substituent, may be used as $R^4$.

Specific examples of the reactive group include step-growth polymerizable substituent groups such as a hydroxyl group, a mercapto group, a primary amino group, secondary amino group, a carboxyl group, an acid anhydride, an acid halide, an isocyanate and the like; chain-growth polymerizable substituent groups such as a vinyl group, a (meth)acryl group, a styryl group, a vinyl ether group, an N-vinylamino group, an epoxy group, an oxetanyl group, a tetrahydrofurfuryl group and the like; and sol-gel reactive substituent group such as an alkoxysilyl group, an alkoxygermyl group, an alkxoystanyl group, an alkoxytitanyl group, an alkoxyzirconyl group and the like.

Of these, it is preferred from the standpoint of the scalability in the preparation of coating film to use chain-growth polymerizable substituent groups, and it is more preferred from the standpoint of the reaction control in the course of the preparation of polymer to use a cationic polymerizable substituent group such as an epoxy group, an oxetanyl group, a tetrahydrofurfuryl group or the like.

It will be noted that with the case where $R^4$ represents an alkyl group which may be substituted and has 1 to 12 carbon atoms, i.e. an ester group (—$COOR^4$), when the resulting fluorine-containing polymer is treated in the presence of an acid or base, there can be obtained a fluorine-containing polymer of the type wherein the above ester group is hydrolyzed into a carboxylic acid (in this case, the polymer obtained is one wherein $R^4$ is a hydrogen atom).

Further, with the case where $R^4$ represents an alkyl group which may be substituted and has 1 to 12 carbon atoms, when a group capable of being hydrolyzed in the presence of an acid or base (hereinafter referred to as hydrolysable substituent group) is introduced as a substituent group and hydrolyzing conditions are properly controlled, there can be obtained a fluorine-containing polymer having a hydroxyl group wherein the hydrolysable substituent group alone is hydrolyzed.

Such hydrolysable substituent groups include: alkoxy groups such as a tert-butoxy group, a methoxymethoxy group, a tetrahydropyranyloxy group, a 2-(trimethylsilyl)ethoxymethoxy group, a triphenylmethoxy group and the like; trialkylsiloxy groups such as a trimethylsiloxy group, a triethylsiloxy group, a tert-butyldimethylsiloxy group, a triisopropylsiloxy group and the like; carboxyloxy groups such as an acetoxy group, a benzoyloxy group, a pivaloyloxy group and the like; and carbonic acid esters such as a tert-butoxycarbonyloxy group and the like.

With the case where $R^4$ represents an alkyl group which is substituted with a hydroxyl group and/or carboxyl group and has 1 to 12 carbon atoms, when the resulting fluorine-containing polymer and a compound having both a substituent group capable of reaction with this hydroxyl group and/or carboxyl group and a polymerizable substituent group are reacted with each other, there can be obtained a self-polymerizable fluorine-containing polymer. The substituent groups capable of reaction with the above hydroxyl group include, a carboxyl group, an acid anhydride, an acid halide, an isocyanate group and the like. The substituent groups capable of reaction with the above carboxyl group include a hydroxyl group, an amino group, a carboxyl group, an acid anhydride, an acid halide and the like. The above-mentioned polymerizable substituent groups include a (meth)acryl group, a vinyl ether group, a vinylphenyl group, an epoxy group, an oxetanyl group and the like.

The compounds having both such a substituent group capable of reaction with a hydroxyl group and/or carboxyl group and a polymerizable substituent group include, for example, (meth)acryloyloxyethyl isocyanate, hydroxyethyl=(meth)acrylate, hydroxybutyl=(meth)acrylate, hydroxymethyloxirane, ethylene glycol monoglycidyl ether, 2-hydroxymethyloxetane, 3-methyl-3-oxetanemethanol, 3-ethyl-3-oxetaneethanol, (meth)acrylic acid, (meth)acrylic chloride and the like.

The fluorine-containing polymer of the invention can be obtained by polymerizing a 1,6-diene-type ether compound represented by the formula [1] and, for example, a (meth)acrylic acid derivative represented by the formula [2] in the presence of a radical generating agent.

[Chemical Formula 5]

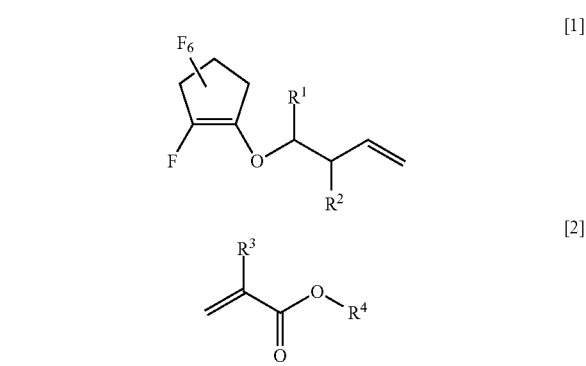

(wherein $R^1$ to $R^4$, respectively, have the same meanings as defined before).

In this case, the compounds represented by the formula [1] or [2] may be used singly or in combination of two or more.

More particularly, the fluorine-containing polymer of the invention includes a copolymer obtained by polymerizing one type of compound represented by the formula [1] and one type of compound represented by the formula [2], a copolymer obtained by polymerizing two or more types of compounds represented by the formula [1] and one type of compound represented by the formula [2], a copolymer obtained by polymerizing one type of compound represented by the formula [1] and two or more types of compounds represented by the formula [2], and a copolymer obtained by polymerizing two or more types of compounds represented by the formula [1] and two or more types of compounds represented by the formula [2].

For the method of polymerization in the presence of a radical generating agent, there may be used bulk polymerization, solution polymerization, suspension polymerization, emulsion polymerization and the like. In the practice of the invention, bulk polymerization is preferred.

The radical generating agent is not critical in type and may be either a heat or light radical generating agent.

The heat radical generating agents include, for example: peroxides such as acetyl peroxide, benzoyl peroxide, methyl ethyl ketone peroxide, cyclohexanone peroxide, hydrogen peroxide, tert-butylhydroperoxide, cumene hydroperoxide, di-tert-butylperoxide, dicumyl peroxide, dilauroyl peroxide, tert-butyl peroxyacetate, tert-butylperoxy pivalate and the like; azo compounds such as 2,2'-azobisisobutyronitrile, 2,2'-azobis(2,4-dimethylvaleronitrile), (1-phenylethyl)azodiphenylmethane, 2,2'-azobis(4-methoxy-2,4-dimethylvaleronitrile), dimethyl 2,2'-azobisisobutyrate, 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane), 2-phenylazo-2,4-dimethyl-4-methoxyvaleronitrile, 2,2'-azobis(2-methylpropane) and the like; and persulfates such as ammonium persulfate, sodium persulfate, potassium persulfate and the like.

The light radical generating agents include, for example, acetophenones, benzophenones, Michler benzoyl benzoate, amyloxime ester, tetramethylthiuram monosulfide, thioxanthones and the like.

Especially, light radical generating agents of a light cleavage type are preferred. Such a light cleavage type of light radical generating agent includes those described in Current UV Curing Technology (p. 159, Publisher: Kazuhiro Takasuki, Publishing Office: Technical Information Society K.K., published in 1991).

Commercially available light radical generating agents include, for example, commercial names of Irgacure 184, Irgacure 369, Irgacure 651, Irgacure 500, Irgacure 819, Irgacure 907, Irgacure 784, Irgacure 2959, CGI1700, CGI1750, CGI1850 and CG24-61, commercial names of Darocure 1116, Darocure 1173, Darocure 4265 and Darocure TPO, and a commercial name of Lucirin TPO (all the above, made by BASF), a commercial name of Ubecryl P36 (made by UCB), commercial names of Esacure KIP150, Esacure KIP65LT, Esacure KIP100F, Esacure KT37, Esacure KT55, Esacure KTO46 and Esacure KIP75/B (all the above, made by Fratelli Lamberti S.P.A.).

The amount of the radical generating agent may be appropriately selected depending on the type of radical generating agent used. In general, the amount is preferably at 0.001 to 5 mole %, more preferably at 0.1 to 1 mole %, relative to the 1,6-diene-type ether compound represented by the foregoing formula [1].

The thermal polymerization reaction temperature may be appropriately selected depending on the type of radical generating agent used and is preferably at 60 to 120° C.

The thermal polymerization time is preferably at 4 to 48 hours.

The irradiation light used for the photopolymerization reaction is one, to which a polymerization initiator contained in a composition is sensitive. More particularly, mention is made of an X-ray, an electron beam, UV light, visible light and the like, of which UV light is preferred.

The photopolymerization reaction is usually carried out at a normal temperature (5 to 35° C.) and the polymerization time may be appropriately selected depending on the type and amount of radical generating agent, the intensity of irradiation light and the like and is generally at 0.01 to 48 hours.

The polymerization ratio between the 1,6-diene-type ether compound represented by the foregoing formula [1] and the (meth)acrylic acid derivative represented by the foregoing formula [2] is arbitrary and is generally such that the ratio by mole is preferably at 0.1:99.9 to 99.9:0.1, more preferably at 50:50 to 95:5.

According to such a polymerization reaction set out above, there can be obtained a fluorine-containing polymer that is assumed to contain structural units represented by the formula [3] and/or the formula [4] and the formula [5].

In this case, it is preferred that the total content of the structural units represented by the formulas [3] and [4] in the fluorine-containing polymer is preferably at 0.1 parts by weight to 99.9 parts by weight in the polymer, and the content of the structural units represented by the formula [5] is at 0.1 parts by weight to 99.9 parts by weight in the polymer.

[Chemical Formula 6]

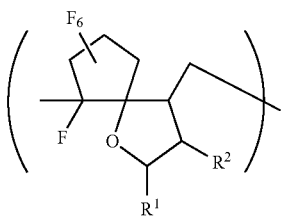

[3]

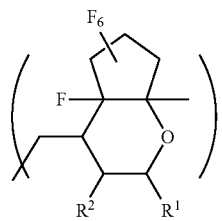

[4]

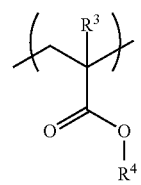

[5]

(wherein $R^1$ to $R^4$, respectively, have the same meanings as defined before).

The fluorine-containing polymer of the invention exhibits a low refractive index as mentioned before and the refractive index at a wavelength of 633 nm is preferably at 1.30 to 1.50.

The fluorine-containing polymer of the invention described above is soluble in solvent and may be used as a varnish.

The solvents used for the preparation of a varnish are not critical in so far as they can uniformly dissolve or disperse the fluorine-containing polymer and additives added, if necessary. Especially, solvents capable of uniformly dissolving the fluorine-containing polymer are preferred.

Such solvents include, for example: ester solvents such as diethyl oxalate, ethyl acetoacetate, ethyl acetate, isobutyl acetate, ethyl butyrate, ethyl lactate, ethyl 3-methoxypropionate, methyl 2-hydroxyisobutyrate and the like; ketone solvents such as methyl ethyl ketone, methyl isobutyl ketone, 2-hexanone, cyclohexanone and the like; propylene glycol solvents such as propylene glycol monomethyl ether, propylene glycol monomethyl ether acetate and the like; cellosolve solvents such as methyl cellosolve, methyl cellosolve acetate and the like; ether solvents such as dibutyl ether, tetrahydrofuran, 1,4-dioxane and the like; alcohol solvents such as ethanol, isopropanol, isopentyl alcohol and the like; aromatic hydrocarbon solvents such as toluene, xylene and the like; and chlorinated hydrocarbon solvents such as dichloromethane, 1,2-dichloroethane, trichloroethylene and the like. These solvents may be used singly or, if necessary, in a mixed solvent of two or more.

The solid (fluorine-containing polymer) content in the varnish is not critical if it is within a range where the fluorine-containing polymer is uniformly dissolved or dispersed. The solid content is preferably at 0.1 to 50 wt %, more preferably at 0.1 to 20 wt %.

It will be noted that the varnish of the invention may be further admixed with a variety of additives capable of showing intended characteristics.

The additives include, for example, crosslinking agents capable of reaction or copolymerization with a reactive substituent group of the fluorine-containing polymer, polymerization initiators capable of initiating crosslinking reaction after decomposition by application of an energy of light, heat or the like.

The crosslinking agent is not critical so far as it reacts or copolymerizes with the reactive substituent group (including the afore-indicated polymerizable substituent group) and includes, for example: a compound having a crosslinkable substituent group such as an epoxy group, an oxetanyl group or the like; a melamine compound having a crosslinkable substituent group such as a methylol group, a methoxymethyl group or the like; a substituted urea compound; a phenoplast compound; a block isocyanate-containing compound; an acid anhydride; and a (meth)acrylic acid compound.

The compounds having a crosslinkable substituent group such as an epoxy group, an oxetanyl group or the like include, for example: epoxy-terminated compounds such as 1,2-epoxyhexadecane, 2-ethylhexyldiglycol glycidyl ether, bisphenol A diglycidyl ether, novolac-type epoxy resins, trisphenolmethane triglycidyl ether, 1,4-butanediol diglycidyl ether, 1,6-hexanediol diglycidyl ether, glycerine triglycidyl ether, trimethylolpropane triglycidyl ether, propylene glycol diglycidyl ether, polyethylene glycol diglycidyl ether and the like; internally epoxidized compounds such as 1,2-epoxy-4-vinylcyclohexane, 3,4-epoxycyclohexylmethyl(meth)acrylate, 2,4-epoxycyclohexylmethyl=3,4-epoxycyclohexane carboxylate, bis(3,4-epoxycyclohexylmethyl)adipate, bis(2,3-epoxycyclopentyl)ether and the like; and oxetanyl compounds such as 3-ethyl-3-hydroxymethyloxetane, 3-ethyl-3-(2-ethylhexyloxymethyl)oxetane, 3-ethyl-3-(cyclohexyloxymethyl)oxetane, 1,4-bis[(3-ethyl-3-oxetanylmethoxy)methyl]benzene, 1,3-bis[(3-ethyl-3-oxetanylmethoxy)methyl]propane, ethylene glycol bis(3-ethyl-3-oxetanylmethyl)ether, trimethylolpropane tris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, ethylene oxide-modified bisphenol A bis(3-ethyl-3-oxetanyl-methyl)ether and the like.

The melamine compounds having a crosslinkable substituent group such as a methylol group, a methoxymethyl group or the like include, for example: CYMEL series such as of hexamethoxymethylmelamine (commercial name: CYMEL (registered trade name) 303), tetrabutoxymethyl glycol uril (CYMEL 1170), tetramethoxymethylbenzoguanamine (CYMEL 1123) (all, made by Japan Cytec Industries Inc.) and the like; and NIKALAC series including methylated melamine resins known under the commercial names of NIKALAC (registered trade name) MW-30HM, NIKALAC MW-390, NIKALAC MW-100LM and NIKALAC MX-750LM and methylated urea resins of NIKALAC MX-270, NIKALAC MX-280 and NIKALAC MX-290 (all, made by Sanwa Chemical Co., Ltd.) and the like.

The phenoplast compounds include, for example, 2,6-bis(hydroxymethyl)-4-methyl phenol, 2,4-bis(hydroxymethyl)-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-bis(hydroxymethyl)phenyl)propane, bis(3-formyl-4-hydroxyphenyl)methane, bis(4-hydroxy-2,5-dimethylphenyl)formylmethane, α,α-bis(4-hydroxy-2,5-dimethylphenyl)-4-formyltoluene and the like.

The above compounds may be available as a commercial product and specific examples thereof include those known under the commercial names of 26DMPC, 46DMOC, DM-BIPC-F, DM-BIOC-F, TM-BIP-A, BISA-F, BI25X-DF and BI25X-TPA (all, made by Asahi Organic Chemicals Industry Co., Ltd.).

The blocked isocyanate-containing compounds are not critical in type so far as they are those compounds that have two or more blocked isocyanate groups, in which an isocyanate group (—NCO) is blocked with an appropriate protective group, in one molecule. Specifically, mention is made of compounds having, in one molecule, two or more substituent groups (which may be the same or different) represented, for example, by the formula [6] as a blocked isocyanate group.

When this type of blocked isocyanate-containing compound is exposed to high temperatures, the protective groups (blocked portions) are removed by thermal dissociation, and crosslinking reaction between the resulting isocyanate group and the hydroxyl group of a fluorine-containing polymer proceeds. It will be noted that these blocked isocyanate-containing compounds can be obtained, for example, by reacting an appropriate blocking agent with compounds having two or more isocyanate groups in one molecule.

[Chemical Formula 7]

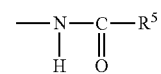

[6]

(wherein $R^5$ represents an organic group at the blocked portion).

The compounds having two or more isocyanate groups in one molecule include, for example, isophorone diisocyanate, 1,6-hexamethylene diisocyanate, methylenebis(4-cyclohexyl isocyanate), trimethylhexamethylene diisocyanate and the like, and their dimers or trimers, or reaction products thereof with diols, triols, diamines and triamines.

The blocking agents include, for example: alcohols such as methanol, ethanol, isopropanol, n-butanol, 2-ethoxyhexanol, 2-N,N-dimethylaminoethanol, 2-ethoxyethanol, cyclohexanol and the like; phenols such as phenol, o-nitrophenol, p-chlorophenol, o-, m- or p-cresol and the like; lactams such as ε-caprolactam and the like; oximes such as acetone oxime, methyl ethyl ketone oxime, methyl isobutyl ketone oxime, cyclohexanone oxime, acetophenone oxime, benzophenone oxime and the like; pyrazoles such as pyrazole, 3,5-dimethylpyrazole, 3-methylpyrazole and the like; and thiols such as dodecane thiol, benzene thiol and the like.

The above blocked isocyanate-containing compounds can be available as a commercial product and for specific examples, mention is made of those known under the commercial names of B-830, B-815N, B-842N, B-870N, B-874N, B-882N, B-7005, B-7030, B-7075 and B-5010 (all, made by Mitsui Chemicals, Inc.); under the commercial names of Duranate (registered trade name) 17B-60PX, Duranate TPA-B80E, Duranate MF-B60X, Duranate MF-K6OX and Durante E402-B80T (all, made by Asahi Kasei Chemicals Corporation); and under the commercial name of Karenz MOI-BM (registered trade name) (made by Showa Denko K.K.).

The acid anhydrides include, for example: compounds having one acid anhydride group in the molecule such as phthalic anhydride, tetrahydrophthalic anhydride, hexahydrophthalic anhydride, methyltetrahydrophthalic anhydride, methylhexahydrophthalic anhydride, nadic anhydride, methylnadic anhydride, maleic anhydride, succinic anhydride, octylsuccinic anhydride, dodecenylsuccinic anhydride and the like; and compounds having two acid anhydride groups in the molecule such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo [3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis (3,4-dicarboxyphenyl)hexafluoropropane dianhydride, 1,3-dimethyl-1,2,3,4-cyclobutanetetracarboxylic dianhydride and the like.

The (meth)acrylic compounds include, for example, ethylene glycol di(meth)acrylate, poly(ethylene glycol)di(meth) acrylate, ethoxylated bisphenol A di(meth)acrylate, ethoxylated trimethylolpropane tri(meth)acrylate, ethoxylated glycerine tri(meth)acrylate, ethoxylated pentaerythritol tetra (meth)acrylate, ethoxylated dipentaerythritol hexa(meth) acrylate, polyglycerine monoethylene oxide poly(meth)acrylate, polyglycerine poly(ethylene glycol)poly(meth)acrylate, dipentaerythritol hexa(meth)acrylate, neopentyl glycol di(meth)acrylate, pentaerythritoltri(meth)acrylate, trimethylolpropane tri(meth)acrylate, tricyclodecanedimethanol di(meth)acrylate, 1,6-hexanediol di(meth)acrylate and the like.

The above compounds can be available as a commercial product and specific examples include those known under the commercial names of NK ester A-200, NK ester A-400, NK ester A-600, NK ester A-1000, NK ester A-DCP, NK ester DCP, NK ester A-DPH, NK ester A-GLY-3E, NK ester A-GLY-9E, NK ester A-GLY-20E, NK ester A-HD-N, NK ester HD-N, NK ester A-TMPT, NK ester A-TMPT-3EO, NK ester A-TMPT-9EO, NK ester TMPT, NK ester ATM-4E, NK ester ATM-35E, NK ester UA-53H, NK ester 1G, NK ester 2G, NK ester 3G, NK ester 4G, NK ester 9G, NK ester 14G, NK ester 23G, NK ester ABE-300, NK ester A-BPE-4, NK ester A-BPE-6, NK ester A-BPE-10, NK ester A-BPE-20, NK ester A-BPE-30, NK ester BPE-80N, NK ester BPE-100N, NK ester BPE-200, NK ester BPE-500, NK ester BPE-900, NK ester BPE-1300N and NK ester NPG (all, made by Shin-Nakamura Chemical Co., Ltd.); under the commercial names of KAYARAD (registered trade name) DPEA-12, KAYARAD PEG400DA, KAYARAD THE-330, KAYARAD RP-1040, KAYARAD DPHA, KAYARAD NPGDA and KAYARAD PET30 (all, made by Nippon Kayaku Co., Ltd.); and under the commercial names of M-210 and M-350 (all, made by Toagosei Co., Ltd.).

The additive amount of these crosslinking agents is generally selected from the range of 0.01 to 100 wt %, preferably 1 to 20 wt %, relative to the weight of the fluorine-containing polymer contained in a varnish.

The polymerization initiator is not critical in type and includes a photo acid generator capable of generating an acid by light irradiation, a thermal acid generator capable of generating an acid by application of heat, a photo radical generator capable of generating radicals by light irradiation, a thermal radical generator capable of generating radicals by application of heat, or the like.

Specific examples of the photo/thermal acid generators include conventional compounds and there are preferably mentioned, for example, onium salts, metallocene complexes and the like.

The onium salts include, for example, diazonium salts, sulfonium salts, iodonium salts, phosphonium salts, selenium salts and the like, and counter ions thereof include anions such as $CF_3SO_3^-$, $C_4F_9SO_3^-$, $C_8F_{17}SO_3^-$, camphorsulfonic acid, tosylic acid, $BF_4^-$, $PF_6^-$, $AsF_6^-$, $SbF_6^-$ and the like. For example, those described in such as JP-A H08-143806 and JP-A H08-283320 can be used after proper selection.

Specific examples of the photo/thermal radical generators include such radical generators as used for the polymerization of the fluorine-containing polymer.

More specific examples of the photo acid generator to include those known under the commercial names of CI-1370, CI-2064, CI-2397, CI-2624, CI-2639, CI-2734, CI-2758, CI-2823, CI-2855 and CI-5102 (all, made by Nippon Soda Co., Ltd.); under the commercial name of PHOTO-INITIATOR 2074 (made by Rhodia Japan Co., Ltd.); under the commercial names of UVI-6974 and UVI-6990 (both, made by The Dow Chemical Company); under the commercial names of ADECA OPTOMER SP-150, ADECA OPTOMER SP-152, ADECA OPTOMER SP-170 and ADECA OPTOMER SP-172 (all, made by Adeca Corporation); and under the commercial name of Irgacure 250 (made by BASF A.G.).

More specific examples of the thermal acid generator include those know under the commercial names of SUNAID SI-60L, SUNAID SI-80L, SUNAID SI-100L and SUNAID SI-150L (all, made by Sanshin Chemical Industry Co., Ltd.); and under the commercial names of ADECA OPTON CP-66 and ADECA OPTON CP-77 (both, made by Adeca Corporation).

The additive amount of these polymerization initiators is generally selected from the range of 0.01 to 20 wt % relative to the weight of the fluorine-containing polymer contained in a varnish and is preferably at 0.1 to 10 wt %.

A thin film can be formed by coating the above-stated varnish on a substrate and heated, if necessary.

Arbitrary coating methods may be used including, for example, a roll coating method, a microgravure coating method, a gravure coating method, a flow coating method, a bar coating method, a spray coating method, a die coating method, a spin coating method, a dip coating method, a doctor blade method and the like. An optimum coating method can be determined from these methods while taking into account the balance of productivity, film thickness control, yield and the like.

It will be noted that the method of making a thin film is not limited to the above coating methods, but a vacuum deposition method and other methods may also be used.

The thin film formed of a fluorine-containing polymer having a reactive substituent group as $R^4$ can be insolubilized in solvents by crosslinking reaction of the reactive substituent group. Although the method for promoting the crosslinking reaction is not limited to specific ones, mention is made of methods using operations such as of irradiation of light or an energy beam, or heating.

Further, the thin film made of a fluorine-containing polymer having a reactive substituent group as $R^4$ can be used to form a micropattern by subjecting the film to pattern exposure to insolubilize an exposed portion in a solvent and removing a non-exposed portion of the thin film by use of the solvent.

In this case, the manner of pattern exposure is not critical, for which mention is made of a method using a patterning mask or a fade mask, a method using interference exposure and the like. An optimum pattern exposure method can be determined from these methods while taking productivity, pattern configuration, pattern size and the like into consideration.

The irradiation light used is one, to which a polymerization initiator contained in the composition is sensitive. More particularly, mention is made of an X-ray, an electron beam, UV light, visible light and the like, of which UV light is preferred.

It will be noted that the developing method is not specifically limited and mentions is made of a spray method, a paddle method, an immersion method, an ultrasonic method and the like using a solvent.

The solvent used for the development is preferably one, which permits a coated film at an exposed portion to be insoluble or soluble very slightly therein and the coated film at a non-exposed portion to be soluble. Specific examples of a liquid developer include, like the solvents exemplified with respect to the above-stated varnish, ester solvents, ketone solvents, propylene glycol solvents, cellosolve solvents, ether solvents, alcohol solvents, aromatic hydrocarbon solvents, chlorinated hydrocarbon solvents and the like. These solvents may be used singly or, if necessary, as a mixed solvent of two or more solvents.

EXAMPLES

A Synthetic Example and Examples are now shown to more particularly illustrate the invention, which should not be construed as limited to the following Examples. It will be noted that analytical devices and conditions used in the Example are indicated below.

[1] $^1$H NMR
  Model: JNM-ECX300, made by JEOL Ltd.
  Solvent for measurement: $CDCl_3$, $CD_3C(=O)CD_3$
  Reference substance: tetramethylsilane (0 ppm)
[2] $^{19}$F NMR
  Model: INOVA-400, made by Varian Technologies Japan Limited
  Solvent for measurement: $CDCl_3$
  Reference substance: trifluoroacetic acid (−76.5 ppm)
[3] Gel permeation chromatography (GPC)
  Model: HLC-8220GPC, made by Tosoh Corporation
  Column: two columns of SHODEX GPC-8051+SHODEX GPC KF-G (guard column)
  Reference column: two columns of SHODEX GPC KF-800RH
  Column temperature: 40° C.
  Detector: RI
  Eluent: THF
  Column flow rate: 1.0 ml/minute
  Reference column flow rate: 0.2 ml/minute
[4] Refractive index
  Model: High-speed spectroscopic ellipsometry M2000-VI, made by J.A. Woollam Japan Co., Ltd.
[5] Contact angle
  Model: VCA Optima, made by AST Products Inc.
  Solvent for measurement: Water, diiodomethane
  Measuring temperature: 23° C.
[6] Light irradiation
  Model: Batch furnace-type UV curing apparatus for 2 kW×one lamp, made by Eye Graphics Co., Ltd.
  Lamp: Mercury lamp H02-L41 2.0 kW, made by Eye Graphics Co., Ltd.

Abbreviations used have the following meanings.
OFCP: Octafluorocyclopentene
BHFC: 1-(3-Butene-1-yloxy)-2,3,3,4,4,5,5-heptafluorocyclopentene
THF: Tetrahydrofuran
PGMEA: Propylene glycol monomethyl ether acetate
GBL: γ-Butyrolactone
MEK: Methyl ethyl ketone Synthetic Example 1

Synthesis of BHFC

Under an argon atmosphere, 3.65 g (65.0 mmols) of potassium hydroxide was added to 13.78 g (65.0 mmols) of OFCP and cooled down to 0° C., in which 4.69 g (65.0 mmols) of 3-buten-1-ol was dropped. The temperature was raised to 20° C., followed by stirring for 24 hours. 23.4 g of water was added, followed by separation of an aqueous phase to obtain an organic phase. The resulting organic phase was purified by reduced pressure distillation (83° C., 103 mmHg) to obtain 8.99 g (yield: 52%) of BHFC. The results of $^1$HNMR and $^{19}$F NMR of the thus obtained product are shown below.

$^1$H NMR (300 MHz, $CDCl_3$): 2.54 (2H, dt, J=6.9 Hz, J=6.6 Hz), 4.43 (2H, dt, J=2.8 Hz, J=6.6 Hz), 5.14 to 5.23 (2H, m) ppm.

$^{19}$F NMR (376 MHz, $CDCl_3$): −163.0 to −162.8 (1F, m), −130.6 to −130.5 (2F, m), −117.1 to −116.9 (2F, m), −115.7 to −115.6 (2F, m) ppm.

Example 1

Copolymerization 1 of BHFC and methyl methacrylate 1.32 g (5.0 mmols) of BHFC obtained in Synthetic Example 1, 0.13 g (1.3 mmols) of methyl methacrylate and 9 mg (0.025 mmols) of benzoyl peroxide (made by Aldrich Corporation and having a water content of 30%) were placed in a glass reactor equipped with a Dimroth condenser, followed by (1) degassing under cooling to −78° C. and (2) melting at room temperature repeating three times to purge the reactor with nitrogen. After polymerization at 80° C. for 24 hours, the resulting polymer was dissolved in a small amount of THF and was dropped in methanol and re-precipitated. This was subjected to decantation, after which the contained solvent was distilled off under reduced pressure to obtain 0.42 g (yield ratio: 29%) of BHFC/methyl methacrylate copolymer 1 (molar ratio=58:42). The weight average molecular weight Mw, determined by GPC, and $^1$H NMR of the thus obtained polymer are indicated below.

Mw (GPC): 15,000

$^1$H NMR (300 MHz, $CDCl_3$): 0.72 to 1.26 (2.5H, m), 1.26 to 2.85 (8.1H, m), 3.13 (1H, br), 3.60 (2.2H, br), 3.71 to 4.57 (2H, m) ppm.

The ratio of the components derived from the respective monomers in the polymer was calculated from the integral ratio between the peak at 3.71 to 4.57 ppm derived from BHFC and the peak at 3.60 ppm derived from the methyl methacrylate in the $^1$H NMR.

Example 2

Copolymerization 2 of BHFC and methyl methacrylate

Similar operations as in Example 1 were carried out except that the amount of methyl methacrylate was changed to 0.34 g (3.3 mmols) and the amount of benzoyl peroxide was changed to 14 mg, thereby obtaining 0.69 g (yield ratio: 42%) of BHFC/methyl methacrylate copolymer 2 (molar ratio=44: 56). The weight average molecular weight Mw, determined by GPC, and $^1$H NMR of the thus obtained polymer are indicated below.

Mw (GPC): 28,000

$^1$H NMR (300 MHz, CDCl$_3$): 0.69 to 1.30 (3.9H, m), 1.30 to 2.88 (8.8H, m), 3.04 (1.1H, br), 3.60 (3.8H, br), 3.75 to 4.57 (2H, m) ppm.

The ratio of the components derived from the respective monomers in the polymer was calculated from the integral ratio between the peak at 3.75 to 4.57 ppm derived from BHFC and the peak at 3.60 ppm derived from the methyl methacrylate in the $^1$H NMR.

Example 3

Measurements of Refractive Index and Contact Angle of the BHFC/methyl methacrylate copolymers 3 parts by weight of the polymers obtained in Examples 1 and 2 were, respectively, dissolved in 97 parts by weight of ethyl acetate to prepare varnishes having a solid content of 3 wt %. Each varnish was coated onto a glass substrate by a spin coating method (300 rpm×5 seconds, followed by a frequency of 1500 rpm×30 seconds). The resulting films were thermally treated on a hot plate at 60° C. for 30 minutes to remove the solvent from the thin films, thereby obtaining the thin films of the polymers obtained in Examples 1 and 2, respectively. The refractive index and contact angle of the respective thin films were measured. The results are shown in Table 1.

TABLE 1

| Copolymer | Compositional molar ratio BHFC:MMA | Refractive index (@ 633 nm) | Contact angle (°) Water | Contact angle (°) Diiodomethane |
|---|---|---|---|---|
| BHFC/MMA copolymer 1 | 58:42 | 1.41 | 92.2 | 65.3 |
| BHFC/MMA copolymer 2 | 44:56 | 1.44 | 98.2 | 63.3 |

MMA: methyl methacrylate

Example 4

Copolymerization of BHFC and n-butyl acrylate

Similar operations as in Example 1 were carried out except that 0.13 g of methyl methacrylate was changed to 0.16 g (1.3 mmols) of n-butyl acrylate, thereby obtaining 0.31 g (yield ratio: 21%) of BHFC/n-butyl acrylate copolymer (molar ratio=50:50). The weight average molecular weight Mw, determined by GPC, and $^1$H NMR of the thus obtained polymer are indicated below.

Mw (GPC): 28,000

$^1$H NMR (300 MHz, CDCl$_3$): 0.92 (3H, br), 1.08 to 2.84 (13.2H, m), 3.02 (1H, br), 3.61 to 4.60 (4.8H, m) ppm.

The ratio of the components derived from the respective monomers in the polymer was calculated from the integral ratio between the peak at 3.02 ppm derived from BHFC and the peak at 0.92 ppm derived from the n-butyl acrylate in the $^1$H NMR.

Example 5

Copolymerization of BHFC and isobornyl methacrylate

Similar operations as in Example 1 were carried out except that 0.13 g of methyl methacrylate was changed to 0.28 g (1.3 mmols) of isobornyl methacrylate, thereby obtaining 0.31 g (yield ratio: 36%) of BHFC/isobornyl methacrylate copolymer (molar ratio=50:50). The weight average molecular weight Mw, determined by GPC, and $^1$H NMR of the thus obtained polymer are indicated below.

Mw (GPC): 29,000

$^1$H NMR (300 MHz, CDCl$_3$): 0.59 to 1.40 (13.7H, m), 1.40 to 2.87 (11H, m), 3.04 (1H, br), 3.60 to 5.70 (3H, m) ppm.

The ratio of the components derived from the respective monomers in the polymer was calculated from the integral ratio between the peak at 3.04 ppm derived from BHFC alone and the peak at 3.60 to 5.70 ppm derived from both BHFC and the isobornyl methacrylate in the $^1$H NMR.

Example 6

Copolymerization of BHFC and tert-butyl methacrylate

Similar operations as in Example 1 were carried out except that 0.13 g (1.3 mmols) of methyl methacrylate was changed to 0.18 g (1.3 mmols) of tert-butyl methacrylate, thereby obtaining 0.26 g (yield ratio: 17%) of BHFC/tert-butyl methacrylate copolymer (molar ratio=48:52). The weight average molecular weight Mw, determined by GPC, and $^1$H NMR of the thus obtained polymer are indicated below.

Mw (GPC): 17,000

$^1$H NMR (300 MHz, CDCl$_3$): 0.78 to 1.28 (3.5H, m), 1.42 (9.6H, br), 1.50 to 2.83 (6.3H, m), 3.05 (0.7H, br), 3.58 to 4.52 (2H, m) ppm.

The ratio of the components derived from the respective monomers in the polymer was calculated from the integral ratio between the peak at 3.58 to 4.52 ppm derived from BHFC and the peak at 1.42 ppm derived from the tert-butyl methacrylate in the $^1$H NMR.

Example 7

Synthesis of a carboxylic acid-Containing, fluorine-Containing polymer by hydrolysis of BHFC/tert-butyl methacrylate Copolymer A mixed solution of 1.00 g of trifluoroacetic acid and 1.00 g of dichloromethane was dropped, under air, in a solution of 0.10 g of the fluorine-containing polymer obtained in Example 6 and dissolved in 1.00 g of dichloromethane. After stirring at room temperature for 19 hours, the low boiling compounds in the reaction solution were distilled off. The resulting polymer was dissolved in a small amount of THF and dropped in hexane for re-precipitation. This was subjected to decantation, after which the contained solvent was distilled off under reduced pressure to obtain 0.08 g (yield ratio: 93%) of a carboxylic acid-containing, fluorine-containing polymer. The $^1$H NMR of the thus obtained polymer is indicated below.

$^1$H NMR (300 MHz, CD$_3$C(=O)CD$_3$): 0.79 to 1.51 (2.2H, m), 1.51 to 3.97 (7.5H, m), 3.15 (0.9H, br), 3.70 to 4.88 (2H, m) ppm.

Example 8

Copolymerization of BHFC and methyl methacrylate and tert-butyl methacrylate

Similar operations as in Example 1 were carried out except that 0.13 g (1.3 mmols) of methyl methacrylate was changed to 0.10 g (1.0 mmols) of methyl methacrylate and 0.036 g (0.25 mmols) of tert-butyl methacrylate, thereby obtaining 0.28 g (yield ratio: 19%) of BHFC/methyl methacrylate/tert-butyl methacrylate copolymer (molar ratios=56:32:12). The weight average molecular weight Mw, determined by GPC, and $^1$H NMR of the thus obtained polymer are indicated below.

Mw (GPC): 20,000
$^1$H NMR (300 MHz, CDCl$_3$): 0.70 to 1.19 (2H, m), 1.40 (1.9H, br), 1.50 to 2.88 (5.6H, m), 3.02 (0.8H, br), 3.60 (1.7H, br), 3.73 to 4.60 (2H, m) ppm.

The ratios of the components derived from the respective monomers in the polymer were calculated from the integral ratios among the peak at 3.73 to 4.60 ppm derived from BHFC, the peak at 3.60 ppm derived from the methyl methacrylate and the peak at 1.40 ppm derived from the tert-butyl methacrylate in the $^1$H NMR.

Example 9

Synthesis of a Carboxylic Acid-Containing, Fluorine-Containing Polymer by Hydrolysis of BHFC/Methyl Methacrylate/Tert-Butyl Methacrylate Copolymer A mixed solution of 1.00 g of trifluoroacetic acid and 2.00 g of dichloromethane was dropped, under air, in a solution of 0.20 g of the fluorine-containing polymer obtained in Example 8 and dissolved in 2.00 g of dichloromethane. After stirring at room temperature for 19 hours, the low boiling compounds in the reaction solution were distilled off. The resulting polymer was dissolved in a small amount of THF and dropped in hexane for re-precipitation. This was subjected to decantation, after which the solvent contained was distilled off under reduced pressure to obtain 0.18 g (yield ratio: 93%) of a carboxylic acid-containing, fluorine-containing polymer. The $^1$H NMR of the thus obtained polymer is indicated below.

$^1$H NMR (300 MHz, CD$_3$C(=O)CD$_3$): 0.78 to 1.50 (2.3H, m), 1.50 to 3.00 (8.8H, m), 3.16 (1H, br), 3.60 (1.8H, br), 3.86 to 4.85 (2H, m) ppm.

Example 10

Copolymerization of BHFC and 2-tert-butoxyethyl methacrylate

Similar operations as in Example 1 were carried out except that 0.13 g of methyl methacrylate was changed to 0.70 g (3.8 mmols) of 2-tert-butoxyethyl methacrylate, the amount of BHFC was changed to 3.96 g (15.0 mmols) and the amount of benzoyl peroxide was changed to 32 mg, thereby obtaining 2.08 g (yield ratio: 45%) of BHFC/2-tert-butoxyethyl methacrylate copolymer (molar ratios=68:32). The weight average molecular weight Mw, determined by GPC, and $^1$H NMR of the thus obtained polymer are indicated below.

Mw (GPC): 34,000
$^1$H NMR (300 MHz, CDCl$_3$): 0.72 to 1.30 (5.9H, m), 1.30 to 2.83 (5.5H, m), 3.03 (1H, br), 3.60 (0.9H, br), 3.86 to 4.85 (2.9H, m) ppm.

The ratio of the components derived from the respective monomers in the polymer was calculated from the integral ratio between the peak at 3.03 ppm derived from BHFC and the peak at 3.60 ppm derived from the 2-tert-butoxyethyl methacrylate in the $^1$H NMR.

Example 11

Synthesis of a Hydroxyl Group-Containing, Fluorine-Containing Polymer by Hydrolysis of BHFC/2-tert-butoxyethyl Methacrylate Copolymer A mixed solution of 5.00 g of trifluoroacetic acid and 5.00 g of dichloromethane was dropped, under air, in a solution of 1.00 g of the fluorine-containing polymer obtained in Example 10 and dissolved in 5.00 g of dichloromethane. After stirring at room temperature for 19 hours, the low boiling compounds in the reaction solution were distilled off. The resulting polymer was dissolved in a small amount of dichloromethane and dropped in hexane for re-precipitation. This was subjected to decantation, after which the solvent contained was distilled off under reduced pressure to obtain 0.70 g (yield ratio: 75%) of a hydroxyl group-containing, fluorine-containing polymer (molar ratio=71:29). The $^1$H NMR of the thus obtained polymer is indicated below.

$^1$H NMR (300 MHz, CD$_3$C(=O)CD$_3$): 0.80 to 1.58 (1.5H, m), 1.58 to 2.98 (6.1H, m), 3.15 (1H, br), 3.70 to 4.91 (3.7H, m) ppm.

The ratio of the components derived from the respective monomers in the polymer was calculated from the integral ratio between the peak at 3.15 ppm derived from BHFC alone and the peak at 3.70 to 4.91 ppm derived from both of BHFC and the 2-tert-butoxyethyl methacrylate in the $^1$H NMR.

Example 12

Copolymerization of BHFC and 2-(tert-butyldimethylsiloxy)-ethyl methacrylate

Similar operations as in Example 1 were carried out except that 0.13 g of methyl methacrylate was changed to 0.31 g (1.3 mmols) of 2-(tert-butyldimethylsiloxy)ethyl methacrylate, thereby obtaining 0.34 g (yield ratio: 21%) of BHFC/2-(tert-butyldimethylsiloxy)ethyl methacrylate copolymer (molar ratio=54:46). The weight average molecular weight Mw, determined by GPC, and $^1$H NMR of the thus obtained polymer are indicated below.

Mw (GPC): 35,000
$^1$H NMR (300 MHz, CDCl$_3$): 0.07 (6H, br), 0.72 to 0.97 (10.8H, m), 0.97 to 2.76 (9.9H, m), 3.03 (0.92H, br), 3.58 to 4.50 (6.4H, m) ppm.

The ratio of the components derived from the respective monomers in the polymer was calculated from the integral ratio between the peak at 0.07 ppm derived only from the 2-(tert-butyldimethylsiloxy)ethyl methacrylate and the peak at 3.58 to 4.50 ppm derived from both of BHFC and the 2-(tert-butyldimethylsiloxy)ethyl methacrylate in the $^1$H NMR.

Example 13

Copolymerization of BHFC and 2-(tert-butoxycarbonyloxy)-ethyl methacrylate

Similar operations as in Example 1 were carried out except that 0.13 g of methyl methacrylate was changed to 0.86 g (3.8 mmols) of 2-(tert-butoxycarbonyloxy)ethyl methacrylate, the amount of BHFC was changed to 3.96 g (15.0 mmols) and the amount of benzoyl peroxide was changed to 26 mg, thereby obtaining 2.03 g (yield ratio: 42%) of BHFC/2-(tert-butoxy-carbonyloxy)ethyl methacrylate copolymer (molar ratio=53:47). The weight average molecular weight Mw, determined by GPC, and $^1$H NMR of the thus obtained polymer are indicated below.

Mw (GPC): 58,000

$^1$H NMR (300 MHz, CDCl$_3$): 0.75 (2.2H, m), 1.49 (7.4H, br), 1.51 to 2.90 (6.6H, m), 3.05 (1H, br), 3.68 to 4.55 (5.1H, m) ppm.

The ratio of the components derived from the respective monomers in the polymer was calculated from the integral ratio between the peak at 3.05 ppm derived from the BHFC and the peak at 1.49 ppm derived from the 2-(tert-butoxycarbonyloxy)ethyl methacrylate in the $^1$H NMR.

Example 14

Copolymerization of BHFC and 3-ethyl-3-methacryloxymethyloxetane

Similar operations as in Example 1 were carried out except that 0.13 g of methyl methacrylate was changed to 0.90 g (5.0 mmols) of 3-ethyl-3-methacryloxymethyloxetane, the amount of BHFC was changed to 5.28 g (20.0 mmols) and the amount of benzoyl peroxide was changed to 35 mg, thereby obtaining 1.73 g (yield ratio: 28%) of BHFC/3-ethyl-3-methacryloxymethyloxetane copolymer (molar ratio=52:48). The weight average molecular weight Mw, determined by GPC, and $^1$H NMR of the thus obtained polymer are indicated below.

Mw (GPC): 32,000

$^1$H NMR (300 MHz, CDCl$_3$): 0.58 to 1.47 (6H, m), 1.47 to 2.85 (7.1H, m), 2.85 to 3.25 (1H, br), 3.63 to 4.70 (7.6H, m) ppm.

The ratio of the components derived from the respective monomers in the polymer was calculated from the integral ratio between the peak at 2.85 to 3.25 ppm derived from the BHFC and the peak at 0.58 to 1.47 ppm derived from the 3-ethyl-3-methacryloxymethyloxetane in the $^1$H NMR.

Example 15

Measurement of Refractive Index

Using the polymers obtained in Examples 4, 6, 8, 9, 10, 12 and 14, varnishes whose concentrations and solvents were indicated in Table 2 were prepared, respectively. The varnish was coated onto a glass substrate according to a spin coating method (under 300 rpm×5 seconds and subsequently under 1,500 rpm×30 seconds). The resulting film was thermally treated on a hot plate to remove the solvent from the thin film. In this way, there were obtained the thin films of the respective polymers. The thus obtained thin films were subjected to measurement of a refractive index at a wavelength of 633 nm. The results are also shown in Table 2.

TABLE 2

| Copolymer | Varnish composition | | Thermal treating conditions | | Refractive index (@ 633 nm) |
|---|---|---|---|---|---|
| | Solvent | Concentration | Temperature | Time | |
| Example 4 | Ethyl acetate | 3 wt % | 80° C. | 10 minutes | 1.44 |

TABLE 2-continued

| Copolymer | Varnish composition | | Thermal treating conditions | | Refractive index (@ 633 nm) |
|---|---|---|---|---|---|
| | Solvent | Concentration | Temperature | Time | |
| Example 6 | Ethyl acetate | 3 wt % | 60° C. | 30 minutes | 1.43 |
| Example 8 | Ethyl acetate | 3 wt % | 80° C. | 10 minutes | 1.43 |
| Example 9 | Ethyl acetate | 5 wt % | 60° C. | 45 minutes | 1.40 |
| Example 10 | PGMEA | 5 wt % | 80° C. | 30 minutes | 1.42 |
| Example 12 | Ethyl acetate | 5 wt % | 60° C. | 30 minutes | 1.44 |
| Example 14 | PGMEA | 10 wt % | 80° C. | 30 minutes | 1.47 |

Example 16

Preparation of Solvent-Insoluble Thin Film by Crosslinking Reaction 9 parts by weight of the polymer obtained in Example 14 were dissolved in 91 parts by weight of PGMEA, to which 5 wt % of photopolymerization initiator RHODORSIL PHOTOINITIATOR 2074 (commercial name of Rhodia Japan Limited) based on the polymer was added, thereby preparing a varnish. This varnish was coated onto a glass substrate according to a doctor blade method (spacer: 25 μm). The resulting film was thermally treated on a hot plate at 80° C. for 30 minutes to remove the solvent from the thin film, thereby obtaining the thin film of the polymer obtained in Example 14. This thin film was subjected to light irradiation at 20 mW/cm$^2$ for 10 minutes to permit the crosslinking reaction in the thin film to proceed. The thin films prior to and after the light irradiation were immersed in several types of organic solvents to evaluate the solvent resistance thereof (O: insoluble, X: soluble). The results are shown in Table 3.

TABLE 3

| | Solvent | | |
|---|---|---|---|
| | PGMEA | GBL | MEK |
| Prior to light irradiation | X | X | X |
| After light irradiation | O | O | O |

Example 17

Copolymerization 2 of BHFC and 2-tert-butoxyethyl methacrylate

Similar operations as in Example 1 were carried out except that 0.13 g of methyl methacrylate was changed to 0.31 g (1.7 mmols) of 2-tert-butoxyethyl methacrylate, the amount of BHFC was changed to 3.96 g (15.00 mmols) and the amount of benzoyl peroxide was changed to 27 mg, thereby obtaining 1.69 g (yield ratio: 40%) of BHFC/2-tert-butoxyethyl methacrylate copolymer (molar ratio=85:15). The weight average molecular weight Mw, determined by GPC, and $^1$H NMR of the thus obtained polymer are indicated below.

Mw (GPC): 29,000

$^1$H NMR (300 MHz, CD$_3$C(=O)CD$_3$): 0.81 to 1.40 (2.2H, m), 1.40 to 2.93 (4.4H, m), 3.19 (1H, br), 3.59 (0.4H, br), 3.82 to 4.80 (2.4H, m) ppm.

The ratio of the components derived from the respective monomers in the polymer was calculated from the integral ratio between the peak at 3.19 ppm derived from the BHFC and the peak at 3.59 ppm derived from the 2-tert-butoxyethyl methacrylate in the $^1$H NMR.

Example 18

Synthesis 2 of a Hydroxyl Group-Containing, Fluorine-Containing Polymer by Hydrolysis of BHFC/2-tert-butoxyethyl methacrylate Copolymer A mixed solution of 1.24 g of trifluoroacetic acid and 1.24 g of dichloromethane was dropped, under air, in a solution of 1.24 g of the fluorine-containing polymer obtained in Example 17 and dissolved in 12.4 g of dichloromethane. After stirring at room temperature for 24 hours, the low boiling compounds in the reaction solution were distilled off. The resulting polymer was dissolved in a small amount of dichloromethane and dropped in methanol for re-precipitation. After decantation, the contained solvent was distilled off under reduced pressure to obtain 1.02 g (yield ratio: 82%) of a hydroxyl group-containing, fluorine-containing polymer (molar ratio=82:18). The $^1$H NMR of the thus obtained polymer is indicated below.

$^1$NMR (300 MHz, CD$_3$C(=O)CD$_3$): 0.85 to 1.60 (0.6H, m), 1.60 to 3.00 (4.6H, m), 3.19 (1H, br), 3.73 to 4.93 (2.9H, m) ppm.

The ratio of the components derived from the respective monomers in the polymer was calculated from the integral ratio between the peak at 3.19 ppm derived only from BHFC and the peak at 3.73 to 4.93 ppm derived from both of BHFC and the 2-tert-butoxyethyl methacrylate in the $^1$H NMR.

Example 19

Preparation 2 of a Solvent-Insoluble Thin Film by Crosslinking Reaction 9 parts by weight of the polymer obtained in Example 18 was dissolved in 91 parts by weight of ethyl acetate, to which 5 wt %, relative to the polymer, of methacryloyloxyethyl isocyanate (commercial name: Karenz MOI, made by Showa Denko K.K.), which was a compound having both a substituent group capable of reaction with hydroxyl group and a polymerizable substituent group, was added. The resulting mixture was subjected to reaction by stirring at room temperature (about 25° C.) for 10 minutes thereby preparing a varnish of a self-polymerizing, fluorine-containing polymer having a methacryl group. This varnish was coated onto a glass substrate according to a spin coating method (1500 rpm, 30 seconds). The resulting film was thermally treated on a hot plate at 200° C. for 10 minutes to cause the crosslinking reaction to proceed thereby obtaining a thermally cured thin film. The thin films prior to and after the thermal curing were, respectively, immersed in acetone to evaluate a solvent resistance thereof. As a consequence, it was confirmed that while the thin film prior to the thermal curing was dissolved in acetone, the thin film after the thermal curing became insoluble in acetone.

What is claimed is:

1. A fluorine-containing polymer, characterized by being obtained by polymerizing a 1,6-diene-type ether compound represented by the formula [1] and a (meth)acrylic compound

[Chemical Formula 1]

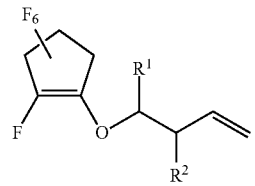

[1]

(wherein R$^1$ and R$^2$ each independently represent a hydrogen atom or an alkyl group which may be substituted and has 1 to 12 carbon atoms).

2. The fluorine-containing polymer as defined in claim 1, wherein said (meth)acrylic acid compound is represented by the formula [2]

[Chemical Formula 2]

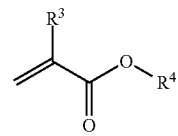

[2]

(wherein R$^3$ represents a hydrogen atom, a fluorine atom or a methyl group, and R$^4$ represents a hydrogen atom, an alkyl group which may be substituted and has 1 to 12 carbon atoms, or an aromatic group which may be substituted and has the number of ring members of 5 to 10).

3. A fluorine-containing polymer, characterized by containing structural units represented by the formula [3] and/or the formula [4] and the formula [5]

[Chemical Formula 3]

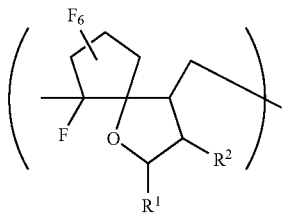

[3]

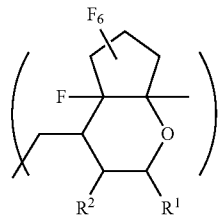

[4]

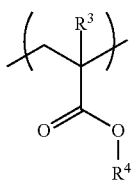

[5]

(wherein R$^1$ and R$^2$ independently represent a hydrogen atom or an alkyl group which may be substituted and has 1 to 12 carbon atoms, R$^3$ is a hydrogen atom, a fluorine atom or a methyl group, and R$^4$ represents a hydrogen atom, an alkyl group which may be substituted and has 1 to 12 carbon atoms or an aromatic group which may be substituted and has the number of ring members of 5 to 10).

4. The fluorine-containing polymer as defined in claim 2 or 3, wherein said $R^4$ is an alkyl group substituted with a reactive substituent group and having 1 to 12 carbon atoms.

5. The fluorine-containing polymer obtained by crosslinking reaction of the fluorine-containing polymer defined in claim 4.

6. The fluorine-containing polymer as defined in claim 1, wherein
said $R^1$ represents an alkyl group having 1 to 12 carbon atoms or a fluoroalkyl group having 1 to 12 carbon atoms, and
said $R^2$ represents a hydrogen atom.

7. The fluorine-containing polymer as defined in claim 1, wherein a refractive index at a wavelength of 633 nm is at 1.30 to 1.50.

8. A varnish comprising the fluorine-containing polymer defined in claim 1.

9. A thin film comprising the fluorine-containing polymer defined in claim 1.

10. A micropattern obtained by subjecting a thin film containing the fluorine-containing polymer defined in claim 4 to pattern exposure to render an exposed portion of said thin film insoluble in a solvent, and removing a non-exposed portion of said thin film by use of the solvent.

11. A method for preparing a fluorine-containing polymer comprising structural units represented by the formula [3] and/or the formula [4] and the formula [5], characterized by polymerizing a 1,6-diene-type ether compound represented by the formula [1] and a (meth)acrylic acid compound represented by the formula [2] in the presence of a radial generating agent

[Chemical Formula 4]

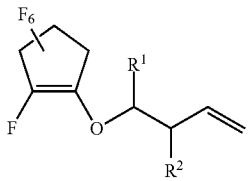

[1]

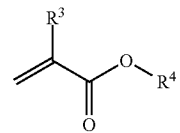

[2]

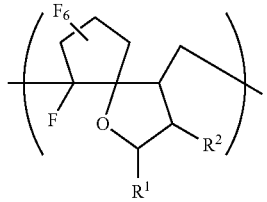

[3]

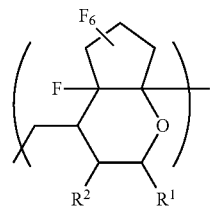

[4]

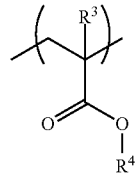

[5]

(wherein $R^1$ and $R^2$ independently represent a hydrogen atom or an alkyl group which may be substituted and has 1 to 12 carbon atoms, $R^3$ is a hydrogen atom, a fluorine atom or a methyl group, and $R^4$ represents a hydrogen atom, an alkyl group which may be substituted and has 1 to 12 carbon atoms or an aromatic group which may be substituted and has the number of ring members of 5 to 10).

* * * * *